June 21, 1960  J. J. PUSEY  2,941,502
BIRD BATH AND PLANT HOLDER
Filed June 20, 1958
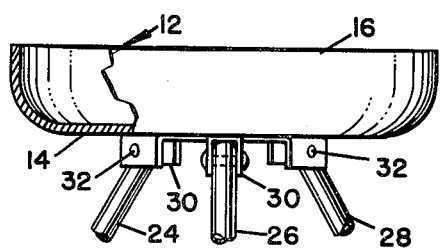
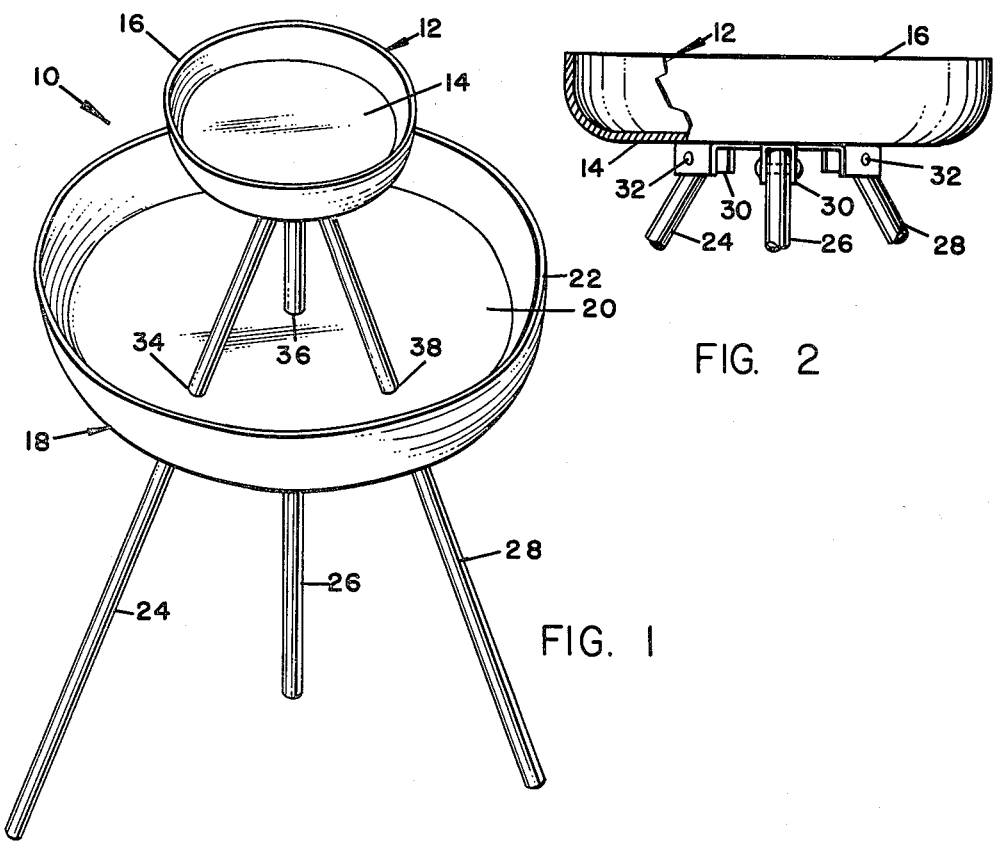
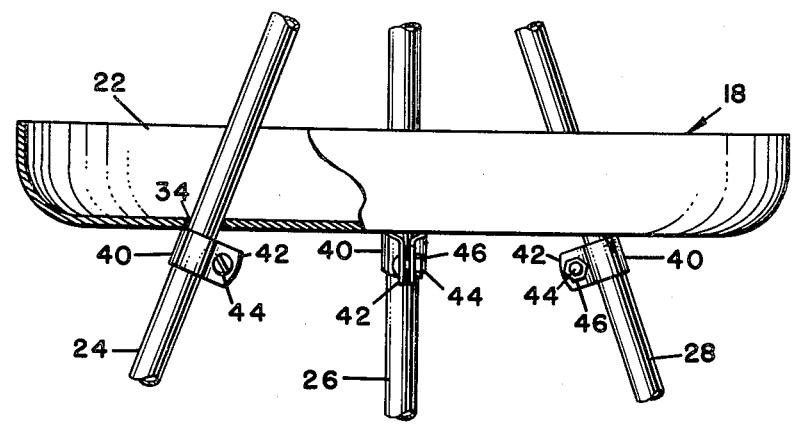
INVENTOR.
JOHN J. PUSEY
BY

United States Patent Office 2,941,502
Patented June 21, 1960

2,941,502

BIRD BATH AND PLANT HOLDER

John J. Pusey, 304 W. Elliott St., Council Bluffs, Iowa

Filed June 20, 1958, Ser. No. 743,359

3 Claims. (Cl. 119—1)

This invention relates to ornamental stands used on lawns and in gardens for flowers, plants, and the like, and which are also used as bird baths, and in particular a stand having a small upper bowl supported by three legs and a large lower bowl through the base of which the three legs extend, thereby providing a bird and flower or plant holder having a new and ornamental appearance.

The purpose of this invention is to provide a bird bath and a planter in which flowers may be plated whereby the bird bath having the flowers closely adjacent thereto is attractive to birds.

Various types of bird baths and stands have been provided for use in gardens, parks, and the like, however, such devices are relatively plain and cold and are not inviting to birds and the like. With this thought in mind this invention contemplates a stand having relatively thin legs with one bowl positioned above another and wherein plants in the lower bowl may grow upwardly toward the upper bowl so that a natural appearance may be presented to birds and the like.

The object of this invention is, therefore, to provide a combination bird bath and flower stand that is designed for use in a garden, park, or lawn, or the like.

Another object of the invention is to provide a combination bird bath and flower stand for use on lawns or in parks or the like in which the device is portable so that it may be moved from one location to another.

Another important object of the invention is to provide a combination bird bath and flower stand in which the parts are readily assembled so that the stand may be set up by the average layman.

A further object of the invention is to provide a bird bath and flower planter in which plants or flowers may be positioned and in which the device may readily be assembled and also readily taken apart.

A still further object is to provide a bird bath in which plants and flowers may be positioned in which the device is of a simple and economical construction.

With these and other objects and advantages in view the invention embodies a small upper bowl having tangs depending from the lower surface, legs positioned with upper ends thereof mounted between the tangs of the upper bowl, a large lower bowl having openings therethrough through which the legs extend, and clamps adjustably mounted on the legs and upon which the large lower bowl rests.

Other features and advantages of the invention will appear from the following description taken in connection with the drawing, wherein:

Figure 1 is a perspective view showing the improved bird bath and flower stand.

Figure 2 is a side elevational view of the small upper bowl of the combination bird bath and flower stand, with the parts shown on an enlarged scale and with parts broken away.

Figure 3 is a side elevational view of the lower large bowl of the bird bath and flower stand also with parts broken away, and with the parts shown on an enlarged scale.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating an upper or small bowl having a base 14 with an upwardly disposed peripheral flange 16, numeral 18 a large or lower bowl having a base 20 with an upwardly disposed peripheral flange 22, and numerals 24, 26 and 28 legs for supporting the bowls.

The base 14 of the upper bowl is provided with pairs of depending tangs 30 between which upper ends of the legs extend, and the legs are pivotally mounted in the tangs by pins 32. The legs extend through openings 34, 36, and 38 in the base 20 of the lower bowl.

The legs are provided with clamps 40 having flanges 42 extended therefrom, and the clamps are secured in position on the legs by bolts 44 on the ends of which nuts 46 are threaded. The lower bowl rests upon the clamps, as shown in Figure 3, and the elevation thereof is readily adjusted.

With the stand assembled in this manner the parts may be readily taken apart to facilitate moving the stand from one position to another, and also to facilitate packing, storing and shipping.

With the parts assembled, as shown in the drawing, plants may be planted in the lower bowl, or flowers may be placed in the lower bowl, and with water in the upper bowl an attractive and inviting bird bath is provided.

The parts may be made of metal, plastic, or other suitable materials and the stands may be supplied in colors.

The rods forming the legs may be round or of any other shape in cross section, and the rods may also be straight or of other designs.

From the foregoing specification is will become apparent that the invention disclosed will adequately accomplish the functions for which it has been designed and in an economical manner, and that its simplicity, use, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthly description is regarded as unnecessary.

Changes in shape, size, and arrangement of details and parts such as come within the purview of the invention claimed may be resorted to in actual practice, if desired.

Having now described the invention that which is claimed to be new and desired to be procured by Letters Patent is:

1. A bird bath and plant stand comprising an upper bowl having a base with an upwardly disposed peripheral flange, a lower bowl also having a base with an upwardly disposed peripheral flange, a plurality of radially disposed legs pivotally connected to the base of the upper bowl and extended through openings in the lower bowl and clamps on the legs for supporting the lower bowl between the upper bowl and lower ends of the legs.

2. In a bird bath and flower holder, the combination which comprises an upper bowl having a base with an upwardly disposed peripheral flange, tangs extended downwardly from the base of the upper bowl, a lower bowl of a greater size than that of the upper bowl spaced downwardly from the upper bowl and also having a base with an upwardly extended peripheral flange, the base of the lower bowl having openings therethrough, radically disposed legs pivotally connected to the tangs of the upper bowl and extended through the openings in the base of the lower bowl, and clamps adjustably mounted on the legs for supporting the lower bowl.

3. In a combination bird bath and plant stand, an upper bowl having a base with an upwardly extended peripheral flange, the base of the upper bowl having pairs of tangs extended downwardly therefrom and said tangs having openings therethrough, a lower bowl, the diameter of which is larger than that of the upper bowl, spaced downwardly from the upper bowl and also having a base with an upwardly disposed peripheral flange, the base of the lower bowl having openings therethrough, rods extended through the openings in the base of the lower bowl, means for connecting upper ends of the rods to tangs of the upper bowl, and clamps adjustably secured by bolts to the rods and positioned below the base of the lower bowl for supporting the lower bowl in adjusted positions between the upper bowl and the lower ends of the rods.

References Cited in the file of this patent

UNITED STATES PATENTS

| | | |
|---|---|---|
| 581,376 | Simpson | Apr. 27, 1897 |
| 2,002,378 | Richardson | May 21, 1935 |

FOREIGN PATENTS

| | | |
|---|---|---|
| 12,083 | Great Britain | July 15, 1899 |